(12) United States Patent
McLean et al.

(10) Patent No.: US 9,533,805 B2
(45) Date of Patent: Jan. 3, 2017

(54) SEAL STOCK LAMINATE

(71) Applicant: Selig Sealing Products, Inc., Forrest, IL (US)

(72) Inventors: Andrew Fenwick McLean, Reading (GB); David John O'Brien, Oxhey (GB); Victor Sachs, Sanderstead (GB); Craig Warren Thornhill, Thatcham (GB)

(73) Assignee: SELIG SEALING PRODUCTS, INC., Forrest, IL (US)

( * ) Notice: Subject to any disclaimer, the term of this patent is extended or adjusted under 35 U.S.C. 154(b) by 443 days.

(21) Appl. No.: 14/019,334

(22) Filed: Sep. 5, 2013

(65) Prior Publication Data

US 2014/0001185 A1 Jan. 2, 2014

Related U.S. Application Data

(62) Division of application No. 11/911,532, filed as application No. PCT/EP2006/061548 on Apr. 12, 2006, now abandoned.

(30) Foreign Application Priority Data

Apr. 15, 2005 (EP) .................................. 05252384

(51) Int. Cl.
*B65D 43/02* (2006.01)
*B65D 51/20* (2006.01)
(Continued)

(52) U.S. Cl.
CPC ................. *B65D 53/00* (2013.01); *B32B 3/02* (2013.01); *B32B 3/10* (2013.01); *B32B 7/04* (2013.01);
(Continued)

(58) Field of Classification Search
None
See application file for complete search history.

(56) References Cited

U.S. PATENT DOCUMENTS 2,768,762 A 10/1956 Eugene
3,235,165 A 2/1966 Jackson
(Continued)

FOREIGN PATENT DOCUMENTS

AT 501393 A1 8/2006
AT 11738 U1 4/2011
(Continued)

*Primary Examiner* — Vivian Chen
(74) *Attorney, Agent, or Firm* — Fitch, Even, Tabin & Flannery LLP (57) ABSTRACT

A method for producing a primary laminate including a tabstock by feeding a seal laminate comprising bottom food contact layers including a foil layer and a top polyester layer to a laminating station wherein either the foil layer of the underside of the polyester layer has been printed; simultaneously feeding a tabstock, which is narrower than the seal laminate, to the laminating station such that the bottom of the tabstock and the top polyester layer of the seal laminate come into contact to form a primary substrate, simultaneously feeding a plastic film stock; and continuously extruding a polymeric adhesive between the top face of the primary substrate and bottom surface of the plastic film stock.

18 Claims, 4 Drawing Sheets

(51) Int. Cl.
  *B65D 51/22*   (2006.01)
  *B65D 53/00*   (2006.01)
  *B65D 77/20*   (2006.01)
  *B65D 39/02*   (2006.01)
  *C09J 123/06*  (2006.01)
  *C09J 123/08*  (2006.01)
  *B32B 3/02*    (2006.01)
  *B32B 3/10*    (2006.01)
  *B32B 7/04*    (2006.01)
  *B32B 7/06*    (2006.01)
  *B32B 7/12*    (2006.01)
  *B32B 15/08*   (2006.01)
  *B32B 15/09*   (2006.01)
  *B32B 27/08*   (2006.01)
  *B32B 27/30*   (2006.01)
  *B32B 27/32*   (2006.01)
  *B32B 27/34*   (2006.01)
  *B32B 27/36*   (2006.01)
  *B65D 17/00*   (2006.01)
  *B32B 37/12*   (2006.01)

(52) U.S. Cl.
  CPC ................. *B32B 7/045* (2013.01); *B32B 7/06* (2013.01); *B32B 7/12* (2013.01); *B32B 15/08* (2013.01); *B32B 15/09* (2013.01); *B32B 27/08* (2013.01); *B32B 27/30* (2013.01); *B32B 27/306* (2013.01); *B32B 27/308* (2013.01); *B32B 27/32* (2013.01); *B32B 27/34* (2013.01); *B32B 27/36* (2013.01); *B32B 37/1284* (2013.01); *B65D 17/16* (2013.01); *B65D 17/163* (2013.01); *B65D 17/165* (2013.01); *B65D 39/02* (2013.01); *B65D 39/025* (2013.01); *B65D 43/0225* (2013.01); *B65D 43/0233* (2013.01); *B65D 43/0277* (2013.01); *B65D 51/20* (2013.01); *B65D 51/22* (2013.01); *B65D 51/228* (2013.01); *B65D 77/20* (2013.01); *B65D 77/204* (2013.01); *B65D 77/2024* (2013.01); *B65D 77/2032* (2013.01); *C09J 123/06* (2013.01); *C09J 123/08* (2013.01); *C09J 123/0853* (2013.01); *C09J 123/0869* (2013.01); *B32B 2250/05* (2013.01); *B32B 2307/4023* (2013.01); *B32B 2307/412* (2013.01); *B32B 2307/75* (2013.01); *B32B 2311/00* (2013.01); *B32B 2323/04* (2013.01); *B32B 2323/10* (2013.01); *B32B 2331/04* (2013.01); *B32B 2333/00* (2013.01); *B32B 2367/00* (2013.01); *B32B 2377/00* (2013.01); *B32B 2435/00* (2013.01); *B32B 2435/02* (2013.01); *Y10T 428/215* (2015.01); *Y10T 428/24802* (2015.01); *Y10T 428/24851* (2015.01); *Y10T 428/24868* (2015.01); *Y10T 428/28* (2015.01); *Y10T 428/2826* (2015.01); *Y10T 428/3175* (2015.04); *Y10T 428/31504* (2015.04); *Y10T 428/31681* (2015.04); *Y10T 428/31725* (2015.04); *Y10T 428/31746* (2015.04); *Y10T 428/31786* (2015.04); *Y10T 428/31797* (2015.04); *Y10T 428/31909* (2015.04); *Y10T 428/31913* (2015.04); *Y10T 428/31928* (2015.04); *Y10T 428/31935* (2015.04); *Y10T 428/31938* (2015.04)

(56) References Cited

U.S. PATENT DOCUMENTS

| | | | |
|---|---|---|---|
| 3,292,828 A | | 12/1966 | Stuart |
| 3,302,818 A | | 2/1967 | Balocca |
| 3,460,310 A | | 8/1969 | Adcock et al. |
| 3,556,816 A | * | 1/1971 | Nughes ............... B32B 15/08 206/484.2 |
| 3,990,603 A | | 11/1976 | Brochman |
| 4,133,796 A | * | 1/1979 | Bullman ............... C09J 121/00 156/330 |
| 4,206,165 A | | 6/1980 | Dukess |
| 4,582,735 A | * | 4/1986 | Smith ................... D21H 17/00 428/34.2 |
| 4,588,099 A | * | 5/1986 | Diez ..................... B65D 51/20 215/232 |
| 4,596,338 A | | 6/1986 | Yousif |
| 4,636,273 A | | 1/1987 | Wolfersperger |
| 4,666,052 A | * | 5/1987 | Ou-Yang ............... B65D 53/04 215/230 |
| 4,735,335 A | | 4/1988 | Torterotot |
| 4,741,791 A | | 5/1988 | Howard |
| 4,770,325 A | | 9/1988 | Gordon |
| 4,801,647 A | * | 1/1989 | Wolfe, Jr. ............. C08L 23/02 524/504 |
| 4,811,856 A | * | 3/1989 | Fischman ............. B65D 55/02 215/232 |
| 4,837,061 A | | 6/1989 | Smits |
| 4,863,061 A | * | 9/1989 | Moore .................. B65D 51/20 215/232 |
| 4,960,216 A | | 10/1990 | Giles |
| 4,961,986 A | | 10/1990 | Galda |
| 5,004,111 A | | 4/1991 | McCarthy |
| 5,015,318 A | | 5/1991 | Smits |
| 5,053,457 A | * | 10/1991 | Lee ....................... C09J 123/08 428/483 |
| 5,055,150 A | | 10/1991 | Rosenfeld |
| 5,057,365 A | | 10/1991 | Finkelstein |
| 5,071,710 A | | 12/1991 | Smits |
| 5,098,495 A | | 3/1992 | Smits |
| RE33,893 E | | 4/1992 | Elias |
| 5,125,529 A | | 6/1992 | Torterotot |
| 5,149,386 A | | 9/1992 | Smits |
| 5,178,967 A | | 1/1993 | Rosenfeld |
| 5,197,618 A | | 3/1993 | Goth |
| 5,217,790 A | * | 6/1993 | Galda ................... B65D 51/20 428/200 |
| 5,265,745 A | | 11/1993 | Pereyra |
| 5,433,992 A | | 7/1995 | Galda |
| 5,513,781 A | | 5/1996 | Ullrich |
| 5,514,442 A | | 5/1996 | Galada et al. |
| 5,598,940 A | | 2/1997 | Finkelstein |
| 5,601,200 A | | 2/1997 | Finkelstein |
| 5,615,789 A | | 4/1997 | Finkelstein |
| 5,669,521 A | | 9/1997 | Wiening |
| 5,702,015 A | | 12/1997 | Giles |
| 5,860,544 A | | 1/1999 | Brucker |
| 5,871,112 A | | 2/1999 | Giles |
| 5,915,577 A | | 6/1999 | Levine |
| 5,975,304 A | * | 11/1999 | Cain .................... B65D 75/326 206/467 |
| 6,082,566 A | | 7/2000 | Yousif |
| 6,096,358 A | | 8/2000 | Murdick |
| 6,131,754 A | | 10/2000 | Smelko |
| 6,139,931 A | | 10/2000 | Finkelstein |
| 6,158,632 A | | 12/2000 | Ekkert |
| 6,194,042 B1 | | 2/2001 | Finkelstein |
| 6,312,776 B1 | | 11/2001 | Finkelstein |
| 6,378,715 B1 | | 4/2002 | Finkelstein |
| 6,458,302 B1 | | 10/2002 | Shifflet |
| 6,548,302 B1 | | 4/2003 | Mao |
| 6,602,309 B2 | | 8/2003 | Vizulis |
| 6,627,273 B2 | | 9/2003 | Wolf |
| 6,699,566 B2 | | 3/2004 | Zeiter |
| 6,705,467 B1 | | 3/2004 | Kancsar |
| 6,722,272 B2 | | 4/2004 | Jud |
| 6,767,425 B2 | | 7/2004 | Meier |
| 6,790,508 B2 | | 9/2004 | Razeti |
| 6,866,926 B1 | | 3/2005 | Smelko |
| 6,902,075 B2 | | 6/2005 | OBrien |
| 6,916,516 B1 | | 7/2005 | Gerber |
| 6,955,736 B2 | | 10/2005 | Rosenberger |
| 6,974,045 B1 | | 12/2005 | Trombach |

(56) References Cited

U.S. PATENT DOCUMENTS

| | | |
|---|---|---|
| 7,128,210 B2 | 10/2006 | Razeti |
| 7,182,475 B2 | 2/2007 | Kramer |
| 7,217,454 B2 | 5/2007 | Smelko |
| RE39,790 E | 8/2007 | Fuchs |
| 7,316,760 B2 | 1/2008 | Nageli |
| 7,448,153 B2 | 11/2008 | Maliner |
| 7,531,228 B2 | 5/2009 | Perre |
| 7,648,764 B2 | 1/2010 | Yousif |
| 7,713,605 B2 | 5/2010 | Yousif |
| 7,740,730 B2 | 6/2010 | Schedl |
| 7,740,927 B2 | 6/2010 | Yousif |
| 7,789,262 B2 | 9/2010 | Niederer |
| 7,798,359 B1* | 9/2010 | Marsella ............. B32B 7/12  215/232 |
| 7,819,266 B2 | 10/2010 | Ross |
| 7,838,109 B2 | 11/2010 | Declerck |
| 7,850,033 B2 | 12/2010 | Thorstensen-Woll |
| 8,057,896 B2 | 11/2011 | Smelko |
| 8,129,009 B2* | 3/2012 | Morris ............... B32B 7/12  428/34.2 |
| 8,308,003 B2* | 11/2012 | O'Brien ............. B32B 5/32  156/244.27 |
| 8,329,288 B2 | 12/2012 | Allegaert |
| 8,348,082 B2 | 1/2013 | Cain |
| 8,906,185 B2* | 12/2014 | McLean ............. B32B 27/08  156/244.11 |
| 9,028,963 B2* | 5/2015 | Thorstensen-Woll . B65D 77/10  428/343 |
| 9,102,438 B2* | 8/2015 | Thorstensen-Woll B65D 77/2032 |
| 2001/0031348 A1* | 10/2001 | Jud ................... B32B 15/08  428/216 |
| 2002/0068140 A1 | 6/2002 | Finkelstein |
| 2003/0087057 A1* | 5/2003 | Blemberg ........... B32B 7/02  428/76 |
| 2003/0168423 A1 | 9/2003 | Williams |
| 2003/0196418 A1* | 10/2003 | O'Brien ............. B65D 51/20  53/490 |
| 2004/0043238 A1 | 3/2004 | Wuest |
| 2004/0109963 A1 | 6/2004 | Zaggia |
| 2005/0048307 A1 | 3/2005 | Schubert |
| 2005/0208242 A1* | 9/2005 | Smelko ............... B32B 27/08  428/35.7 |
| 2006/0000545 A1 | 1/2006 | Nageli |
| 2006/0003120 A1 | 1/2006 | Nageli |
| 2006/0003122 A1 | 1/2006 | Nageli |
| 2006/0151415 A1 | 7/2006 | Smelko |
| 2006/0278665 A1 | 12/2006 | Bennett |
| 2007/0003725 A1 | 1/2007 | Yousif |
| 2007/0065609 A1 | 3/2007 | Korson |
| 2007/0267304 A1 | 11/2007 | Portier |
| 2007/0298273 A1 | 12/2007 | Thies |
| 2008/0026171 A1 | 1/2008 | Gullick |
| 2008/0073308 A1 | 3/2008 | Yousif |
| 2008/0103262 A1 | 5/2008 | Haschke |
| 2008/0145581 A1* | 6/2008 | Tanny ................ B32B 7/06  428/36.6 |
| 2008/0156443 A1 | 7/2008 | Schaefer |
| 2008/0169286 A1 | 7/2008 | McLean |
| 2008/0231922 A1 | 9/2008 | Thorstensen-Woll |
| 2008/0233339 A1 | 9/2008 | Thorstensen-Woll |
| 2008/0233424 A1 | 9/2008 | Thorstensen-Woll |
| 2009/0078671 A1 | 3/2009 | Triquet |
| 2009/0208729 A1 | 8/2009 | Allegaert |
| 2009/0304964 A1 | 12/2009 | Sachs |
| 2010/0009162 A1 | 1/2010 | Rothweiler |
| 2010/0030180 A1 | 2/2010 | Deckerck |
| 2010/0047552 A1 | 2/2010 | McLean |
| 2010/0059942 A1 | 3/2010 | Rothweiler |
| 2010/0116410 A1 | 5/2010 | Yousif |
| 2010/0155288 A1 | 6/2010 | Harper |
| 2010/0170820 A1 | 7/2010 | Leplatois |
| 2010/0193463 A1 | 8/2010 | OBrien |
| 2010/0213193 A1 | 8/2010 | Helmlinger |
| 2010/0221483 A1 | 9/2010 | GonzalezCarro |
| 2010/0290663 A1 | 11/2010 | Trassl |
| 2010/0314278 A1 | 12/2010 | Fonteyne |
| 2011/0000917 A1 | 1/2011 | Wolters |
| 2011/0005961 A1 | 1/2011 | Leplatois |
| 2011/0089177 A1 | 4/2011 | Thorstensen-Woll |
| 2011/0091715 A1 | 4/2011 | Rakutt |
| 2011/0100949 A1 | 5/2011 | Grayer |
| 2011/0100989 A1 | 5/2011 | Cain |
| 2011/0138742 A1 | 6/2011 | McLean |
| 2011/0147353 A1 | 6/2011 | Kornfeld |
| 2012/0000910 A1 | 1/2012 | Ekkert |
| 2012/0043330 A1 | 2/2012 | McLean |
| 2012/0067896 A1 | 3/2012 | Daffner |
| 2012/0103988 A1 | 5/2012 | Wiening |
| 2012/0111758 A1 | 5/2012 | Lo |
| 2012/0241449 A1 | 9/2012 | Frischmann |
| 2013/0020324 A1 | 1/2013 | Thorstensen-Woll |
| 2014/0061196 A1 | 3/2014 | Thorstensen-Woll |
| 2014/0186589 A1 | 7/2014 | Chang |
| 2014/0224800 A1* | 8/2014 | Thorstensen-Woll B65D 43/0235  220/255 |

FOREIGN PATENT DOCUMENTS

| | | |
|---|---|---|
| BR | 8200231 U | 9/2003 |
| BR | 0300992 A | 11/2004 |
| CA | 2015992 A1 | 1/1991 |
| DE | 102006030118 B3 | 5/2007 |
| DE | 10204281 A1 | 8/2007 |
| DE | 102007022935 B4 | 4/2009 |
| DE | 202009000245 U1 | 4/2009 |
| EP | 0668221 A1 | 8/1995 |
| EP | 0826598 A2 | 3/1998 |
| EP | 0826599 A2 | 3/1998 |
| EP | 0 905 039 * | 3/1999 |
| EP | 0717710 B1 | 4/1999 |
| EP | 0915026 A1 | 5/1999 |
| EP | 0706473 B1 | 8/1999 |
| EP | 1075921 | 2/2001 |
| EP | 0803445 B1 | 11/2003 |
| EP | 1462381 A1 | 9/2004 |
| EP | 1199253 B1 | 3/2005 |
| EP | 1577226 A1 | 9/2005 |
| EP | 1814744 A1 | 8/2007 |
| EP | 1834893 A1 | 9/2007 |
| EP | 1837288 A1 | 9/2007 |
| EP | 1839898 A1 | 10/2007 |
| EP | 1839899 A1 | 10/2007 |
| EP | 1857275 A1 | 11/2007 |
| EP | 1873078 A1 | 1/2008 |
| EP | 1445209 B1 | 5/2008 |
| EP | 1918094 A1 | 5/2008 |
| EP | 1 935 636 * | 6/2008 |
| EP | 1968020 A1 | 9/2008 |
| EP | 1992476 A1 | 11/2008 |
| EP | 2230190 A1 | 9/2010 |
| EP | 2292524 A1 | 3/2011 |
| FR | 2916157 A1 | 11/2008 |
| FR | 2943322 A1 | 9/2010 |
| KR | 100711073 B1 | 4/2007 |
| KR | 100840926 B1 | 6/2008 |
| KR | 100886955 B1 | 3/2009 |
| MX | 05002905 A | 2/2006 |
| MX | 2010001867 A | 4/2010 |
| WO | WO 97/02997 * | 1/1997 |
| WO | 9905041 A1 | 2/1999 |
| WO | 0066450 | 11/2000 |
| WO | WO 00/66450 * | 11/2000 |
| WO | 2006018556 A1 | 2/2006 |
| WO | 2006021291 A1 | 3/2006 |
| WO | 2006073777 A1 | 7/2006 |
| WO | 2006108853 A1 | 10/2006 |
| WO | 2008027029 A2 | 3/2008 |
| WO | 2008027036 A1 | 3/2008 |
| WO | 2008039350 A2 | 4/2008 |
| WO | 2008125784 A1 | 10/2008 |
| WO | 2008125785 A1 | 10/2008 |
| WO | 2008148176 A1 | 12/2008 |

(56) References Cited

FOREIGN PATENT DOCUMENTS

| | | |
|---|---|---|
| WO | 2009092066 A2 | 7/2009 |
| WO | 2010115811 A1 | 10/2010 |
| WO | 2011039067 A1 | 4/2011 |
| WO | 2012079971 A1 | 6/2012 |
| WO | 2012113530 A1 | 8/2012 |
| WO | 2012152622 A1 | 11/2012 |
| WO | 2012172029 A1 | 12/2012 |

* cited by examiner

SEAL STOCK LAMINATE

CROSS-REFERENCE TO RELATED APPLICATIONS

This application is a divisional of prior application Ser. No. 11/911,532, filed Oct. 14, 2007, which is the U.S. national phase application filed under 35 U.S.C. §371 of International Application PCT/EP2006/061548, filed Apr. 12, 2006, designating the United States, which claims priority from European Application EP 05252384.2, filed Apr. 15, 2005, which are all hereby incorporated herein by reference in their entirety.

FIELD

The present invention relates to a method of making a laminate which is used in container closure systems. The laminate produced is a primary laminate stock including a tabstock which can then be attached to a secondary seal and used for re-closing a container using a screw cap.

BACKGROUND

It is commonplace in the packaging of a wide variety of materials ranging from pharmaceutical products to instant coffee that a closure is provided in the form of a seal connected to the neck of a container and a screw cap covering and protecting the seal which provides a re-closable cap after the seal has been removed to gain access to the container. Often the closure is such that the underside of the seal has a heat sensitive adhesive coating or a meltable plastics layer covered by a metal foil. The metal foil can provide the substrate of the seal or may include a separate substrate formed from plastics material or paper. The seal is then placed against the neck of a container and sandwiched against it by the applied screw cap. An induction heating step then heats the metal foil and in turn activates the heat sensitive adhesive layer or melts the plastic layer so that on cooling, the seal bonds to the neck of the container. A difficultly often encountered by eventual users is removal of such seals from the container. Attempts have thus been made to include a tab extending sideways from the neck of the container so that the consumer can grip this to facilitate removal of the seal.

Single component systems have been developed wherein the primary seal and secondary liner are produced as a laminate disk which is attached within the cap. The commercially available Quadraseal (®) system is an example of a single component system. The bottom layer of the seal portion is formed of glassine which is attached to a foil layer by means of a wax based adhesvive. Upon removal of a cap into which the system is fitted, the seal portion remains adhered to the neck of the container. It can be removed by puncturing the seal and tearing it off in pieces. Due to failure of the glassine fibres, there will be traces of fibres remaining adhered around the circumference of the neck.

A further example is DE9108868 in which the primary seal and secondary liner are adhered by means of wax. On heating of the metal foil in the primary seal portion the wax melts and is absorbed into the secondary liner whereby the primary seal and secondary liner substantially separate from each other. On opening the primary seal remains adhered to the container and the secondary liner remains in the cap. This system includes a tab which is formed by only adhering the top layer of primary seal to the remainder of the seal across part of the diameter of the seal. One problem with this system is that there are residues of wax material left on the surface of the liner such that when the container is resealed, some of the contents of the container may stick to the liner surface or may be released into the container itself. In the packaging of food and pharmaceuticals, such a wax residue is undesirable, Attempts have therefore focussed on the use of a plastics based means for adhering the primary seal to the secondary liner as a so-called release layer to avoid the use of wax. It is also very difficult to ensure that during attachment of the seal to the container to be sealed, the heat produced does not cause the delaminated portion which forms the tab to adhere to the remainder of the primary seal portion.

A further example of a system including a tab structure is the "Top Tab" structure disclosed is U.S. Pat. No. 4,961,986. This structure includes a multilayer primary seal, one layer of which is partly de-laminated to provide a lifting tab lying wholly within the circumference of the container neck in use. This system is essentially a system comprising a primary seal and secondary liner whereby the secondary liner has been adhered to a cap. The primary seal is then pushed into the cap and held in place by engagement with the screw thread within the cap. In this system, the tabs are adhered to the primary seal by applying an adhesive layer in strips and then adhering the top layer with the result that it is only stuck in particular portions where the adhesive was present. Such a method is time consuming as it involves the gradual layer-by-layer construction of the primary seal including the tab and involves the use of a specifically formed roller to apply the adhesive in strips.

A further tab system is the successful "Lift "n" Peel" (®) commercial system. This can be comprised of a primary seal and a secondary liner or just a primary seal and is usually just a primary seal. The primary seal includes a thick layer of foam such that the seal can be a product in its own right without requiring a secondary liner to give it stability. The thickness of the foam allows for discrepancies in the container or cap size. However, the foam is expensive and the resulting primary seal is difficult to manipulate. A further disadvantage associated with including foam is that it is not a printable substrate, Nowadays, consumers rely heavily on the labelling of goods and it is desirable to be able to provide a seal that is printed to indicate the manufacturer. It is usual that the printing is done on the foil layer included within the heat induction layers. This will only be seen where the layers on top of the metal foil are transparent. The "Lift "n" Peel" system does not present this opportunity due to the opaque nature of the foam. The top layer of the Lift "n" Peel system is a particular polyethylene terephthalate/ethylene vinyl acetate (PET/EVA) structure. The presence of EVA is necessary to ensure adhesion to both the PET tab and the foam. If the EVA were to be printed then this would interfere with the adhesion properties it exhibits. Hence reverse i.e. printing the underside of the top layer of the "Lift "n" Peel" system is not a viable option. The PET/EVA structure used is an expensive material and additionally requires the use of heated rollers to melt the EVA component of the structure to achieve adhesion. The lower the amount of EVA used, the greater the size of the heated roll required. Thus to use a material of low cost which contains minimal EVA, the size of the roll required becomes prohibitively large and expensive.

In WO 97/02997, a method for including a tab in a primary seal laminate is disclosed. In this case three feeds are passed to a chill roll in contact with a nip roll. The first feed which will form the top layer of the primary seal laminate, is EVOH coated with polypropylene. The second feed is a deadening member and the third feed is extruded tabstock e.g. polypropylene. All three feeds come into contact at the point where the chill roll and nip roll are in contact. The chill roll quenches the extruded tabstock maximising its amorphous properties and causes lamination of all three layers.

SUMMARY

It is therefore clear that there is a need for a simple and cost effective method for including a tabstock in a primary seal laminate. Such a method should avoid the problems associated with the prior art such as having to carry out step-by-step lamination, producing an ineffective tab or the necessity to use expensive equipment and materials. It would be advantageous in the current market to produce a primary laminate including a tab which is printed or coloured.

The apparatus required must have separate unwind stations for the laminate feeds that are arranged to enable simultaneous unwinding. The laminate feeds are fed to a lamination station comprising two rollers in contact with each other. At this point the feeds are adhered to each other to produce the laminate including a tabstock which is subsequently wound onto a final roll and can then be passed through the same apparatus and adhered to a secondary laminate. The adhesive is applied vertically downwards onto the point where the feed rollers are in contact. The speed of the feed rollers should be faster than the rate of application of adhesive. The adhesive can be applied directly from the die head of an extruder.

The present invention provides a method for producing a primary laminate including a tabstock the method comprising the steps of:
  a) feeding a seal laminate comprising bottom food contact layers including a foil layer and a top polyester layer to a laminating station;
  b) feeding a tabstock, which is narrower than the seal laminate, to the laminating station such that the bottom of the tabstock and the top polyester layer of the seal laminate come into contact to form a primary substrate, the top face of which is partly comprised of the top face of the tabstock and partly comprised of the top polyester layer of the seal laminate, prior to reaching the laminating station;
  c) feeding a plastic film stock which has a top and bottom surface to the laminating station; and
  d) continuously extruding a polymeric adhesive between the top face of the primary substrate and the bottom surface of the plastic film stock such that the two are adhered together with a bond strength greater than 15 N/cm when the tabstock is pulled at 90° to the machine direction and 180° to the primary substrate, to form a primary laminate including a tabstock.

In one embodiment of the present invention, the bottom food contact layers of the seal laminate are induction heat sealable and comprise a layer of aluminium foil coated on its lowermost face which will ultimately be in contact with the neck of a container with a layer of hot melt adhesive. A layer of polyethylene terephthalate may be interposed between the hot melt adhesive and aluminium foil layer to isolate the foil from the contents of any container to which it is attached and so prevent corrosion of the foil layer. This polyethylene terephthalate layer generally has a thickness in the range from 10 to 14 µm. It is attached to the foil layer using either a solvent or solvent-less adhesive lamination. Where it is included, the polyethylene terephthalate has already been attached to the foil layer by the supplier. Preferably the thickness of the foil layer is in the range from 12-30 µm.

In a further embodiment of the present invention the bottom food contact layers of the seal laminate are conduction heat sealable.

In a yet further embodiment of the present invention, the bottom food contact layer of the seal laminate comprise a layer comprising a layer of metal foil coated on its lowermost face which will ultimately be in contact with the neck of a container with glassine. Glassine is a paper based material which is formed from pulp which has been beaten to the extent that its constituent fibres are all very short resulting in a brittle material which is almost transparent. Glassine is commercially available from, for example, Ahlstrom in France. The glassine is adhered to the lowermost face of the metal foil by a layer of adhesive. While conventionally in such a system, a wax based adhesive would be used to adhere the glassine to the foil, it is preferable in the invention to use a polyethylene-based or a water-based adhesive in order to ensure a sufficiently strong bond is formed.

The bottom glassine layer of the primary laminate may be adhered to the neck of a container using a conventional adhesive such as, for example, PVA. In this embodiment, the thickness of the foil layer may be as low as 9 µm. In use, where the primary laminate is removed from a container neck, failure will occur in the glassine layer such that paper fibres remain adhered to the neck of the container but the primary laminate is still removed as a single piece. The advantage of the paper fibres remaining adhered to the neck is that it provides a tamper evident system.

The foil layer may optionally be printed such that the identity of the manufacturer of the ultimate contents of any container to which the primary laminate is adhered is evident. Consumers view this as a guarantee of safety, quality and of the origin of the contents. Where the foil layer is printed, this will have been done by the supplier of the foil layer.

The top layer of the seal laminate is a layer of polyester. Such a layer is included in order to impart strength into the primary seal laminate such that it can not simply be ripped or broken easily manually. Additionally, including this layer means that the print is not in direct contact with the extruded polymeric adhesive and thus elimination of potentially problematic interactions. Preferably the thickness of the top polyester layer is at least 12 µm. A preferred thickness is in the range from 12 to 25 µm In a preferred embodiment of the present invention, the polyester is polyethylene terephthalate. Where the top polyester layer of the seal laminate is polyethylene terephthalate, it is preferable that prior to being contact with the polymeric adhesive, it has been corona treated.

As is clear, it is preferable that one of the components of the primary seal laminate is printed. This can be achieved by including a foil layer with a preprinted upper face in the heat sealable layers. Alternatively, the underneath of the polyester layer which will not be in contact with the polymeric adhesive can be printed. In both cases it is required that the polyester layer is transparent such that the printing on either the metal foil or underneath of the polyester layer is immediately visible to the end user. The printing is carried out prior to the inclusion of the tabstock.

The primary seal laminate formed includes a free tab as is included in the "Top Tab" (®) and "Lift "n" Peel" (®) structures described in U.S. Pat. No. 4,961,986. In the primary seal laminate produced, while the relative dimensions of the tab are not limited, it may be preferable that, for example the tab lies wholly within the circumference of the container neck and typically the tab occupies about 50% of the seal area, where the primary laminate has a diameter of less than 36 mm. The tab is provided by adhering a tab stock to the top polyester layer of the heat sealable laminate.

The tabstock which is fed to the laminating station as detailed in step (b) is narrower in width than the heat sealable laminate. Preferably the tabstock is formed of a polyester, more preferably polyethylene terephthalate. In one embodiment of the present invention, the bottom surface of the tabstock which is ultimately in contact with the top polyester layer of the heat sealable laminate may be coated with a release material, for example, silicone. This is done in order to further ensure that when the finished primary seal laminate is adhered to a container by induction heat sealing, the tabstock does not stick to the top polyester layer. The tabstock may further include a coloured or printed layer formed of polyester and attached to the other polyester layer by an adhesive tie layer.

In step (b), in one embodiment of the present invention, rather than feeding a single tabstock, the feed may comprise a plurality of narrow tabstocks arranged at regularly spaced apart intervals. In this way, a wide sheet of primary laminate including a tabstock may be formed which can then be cut as required thus improving the efficiency of the system.

As detailed in step (c), the third feed which is fed to the laminating station is a plastic film stock. Preferably the plastic film is selected from the group consisting of polyethylene terepthalate, polyamide, polypropylene or a composite. Most preferably the plastic film is polyethylene terephthalate. The width of this stock is the same as the width of the heat sealable laminate. This plastic film layer must be transparent in order that the printing of the lower layers is visible to the end user. Preferably the thickness of the plastic film layer is at least 12 μm. More preferably the thickness of the plastic film layer is in the range from 12-36 μm. In a preferred embodiment of the present invention, where plastic film is PET stock, preferably it is both coextruded and corona treated. This is done in order to ensure that the bond formed to the polymeric adhesive in step (d) is sufficiently strong. The PET stock can be obtained in a coextruded state. Examples of suitable materials include Lumirror 10.47 which is a film that is coextruded on one side and are commercially available from Toray.

Prior to reaching the laminating station, the bottom face of the tabstock and the top PET layer of the seal laminate are brought into contact. At this stage, there is no adhesion between the two feeds. The two feeds are fed in contact with one another to the laminating station. In order to achieve this, the two feeds must approach the laminating station from the same side. The combination of the seal laminate and tabstock in contact with each other is referred to as a primary substrate as they are passed to the laminating station together. As the tabstock is necessarily narrower in width than the seal laminate, the top face of the primary substrate presented to the laminating station is formed partly of the top face of the tabstock and partly of the top polyester layer of the seal laminate.

In the laminating station, the primary substrate is brought into contact with the plastic film stock which is fed simultaneously to the laminating station but from the opposite side. At the point where the top face of the primary substrate is in contact with the bottom surface of the plastic film stock, a polymeric adhesive is continuously extruded between the two surfaces. The result is that the plastic film stock is adhered over the entire surface area of the top face of the primary substrate. This means that over part of the width, the plastic stock will be adhered to the top plastic film layer of the seal laminate and over the remaining width the plastic film stock will be adhered to the top face of the tabstock. The result is then that a tab portion is formed which lies wholly within the circumference of the primary laminate formed.

The bond formed between the top plastic film layer of the seal laminate and the plastic film stock must have a strength in the greater than 15 N/cm when the tab is pulled at 90° to the machine direction and 180° to the primary substrate. This is in order to ensure that when using the tab to remove the seal from a container, the tab remains adhered to the primary laminate upon application of a pulling force to the tab.

Preferably the polymeric adhesive which is continuously extruded is selected from polyethylene, polyethylene vinyl acetate, maleic anhydride/acrylate ester/polyethylene copolymer and ethylene methyl acrylate. Most preferably the polymeric adhesive has a melt flow index in the range from 1 to 17 dg/min. Preferably the coat weight of the adhesive layer is at least 30 $gm^{-2}$.

In a preferred embodiment the coat weight of the adhesive layer is in the range from 20 to 40 $gm^{-2}$. In a preferred embodiment, the polymeric adhesive is an ethylene methyl acrylate co-polymer.

In order that any printing can be seen, preferably the polymeric adhesive and the plastic film stock are transparent.

The primary laminate including a tabstock as made according to the present invention may then be attached to a secondary seal stock so as to form a one component seal and liner system. This can be done using the same apparatus as used to form the primary laminate including a tabstock. More specifically, the method involves the steps of:
feeding the primary laminate including a tabstock to a laminating station;
simultaneously feeding a secondary seal stock which has an overall stiffness in the range from 200-1200 gcm and has an upper face for contact with a container closure and a lower face for sealing against a container to the laminating station; and
extruding a polymeric adhesive with a melt flow index in the range from 5-17 dg/min through a die head between the top plastic film face of the primary laminate including a tabstock and lower face of the secondary seal stock to adhere the two to form a seal stock laminate.

The secondary seal stock of the present invention has a stiffness in the range from 200-1200 gcm. This stiffness is measured according to the Teledyne Taber V-S Stiffness Tester (Model 150-B). The method employed involves cutting the test samples to size of 3.8 cm by 7 cm (1.5×2.75 inches) one with the grain of the board and one at right angles to the grain. The test is carried out at room temperature. The top of the sample is then clamped so that it is central, parallel to the tester face and the bottom of the sample is resting on the plate below the rollers of the machine. The right hand roller is brought up to just touch the bottom of the sample without deflecting it. The left hand roller is brought into light contact with the sample and then backed off by a quarter of a turn. Care is taken to ensure that the scale, driving disc and pendulum are all aligned at zero. The sample is deflected in one direction by pushing the operating switch until the pendulum is at 15°. The value on the fixed scale is recorded. The direction of the pendulum is then reversed and the sample is deflected in the opposite direction by 15° and the value is recorded from the fixed scale. The average of the two values is taken and the appropriate weight multiplication factor is used to determine the stiffness in Taber units (gcm)

In some embodiments, where a secondary seal stock is included, it may be formed of pulpboard or folding box board. Alternatively, the secondary seal stock may be a synthetic laminate. Where the secondary seal stock is a synthetic laminate it is preferable that it comprises a foam with a facing layer on each face thereof. The thickness of the foam layer is preferably in the range from 0.85-1.65 mm and suitable materials include polyethylene and polypropylene foam. The thickness of the facing layers is preferably in the range from 20-70 µm.

The facing layers may comprise a single layer, for example a polyethylene terephthalate, polyethylene, polypropylene or polyamide film, or alternatively may comprise multilayers. The nature of the facing layer depends on the nature of the foam layer and the polymeric adhesive. Where a facing layer which is equally compatible with both the foam layer and polymeric adhesive cannot be found, it is necessary for the facing layers to be multilayer to achieve a graded layer which will adhere tightly to the adhesive and subsequently the foam. The graded layers will tend to be able to heat seal to itself. Where the facing layers are multilayer, it is preferred that the facing layers comprise a homopolymer core with a copolymer layer on each face thereof. The homopolymer core is chosen to ensure that the synthetic laminate has the appropriate stiffness.

In one embodiment of the present invention where a secondary seal stock is adhered to the primary laminate, the foam layer is polyethylene foam and the facing layers are comprised of three layers, specifically a homopolymer core with copolymer layers on each face thereof wherein the homopolymer core comprises polypropylene and the copolymer is a polyethylene/polypropylene copolymer. Inclusion of the polypropylene homopolymer layer ensures that the synthetic laminate has the appropriate stiffness. Such a secondary seal stock can be obtained commercially or can be produced by lamination as required.

In this embodiment of the present invention where the foam layer is polyethylene foam and the facing layers are comprised of a polypropylene core with polypropylene/polyethylene copolymer layers on each face thereof preferably the polymeric adhesive is provided by coextruding polypropylene and polyethylene through the die head such that the polypropylene is in contact with the lower face of the secondary seal stock and the polyethylene is in contact with the top plastic film face of the primary laminate.

In order to adhere the primary seal laminate to the secondary seal stock, a polymeric adhesive is extruded between the top plastic film face of the primary seal laminate and the lower face of the secondary seal stock. The polymeric adhesive must have a melt flow index in the range of 5-25 dg/min. The method used to determine the melt flow index is International Standard ISO 113/ASTM D 1238.

The strengths of the different bonds formed in the seal stock laminate are important. In use, the bond formed between the food contact layer of the laminate and the neck of the container which it is used to seal, should be sufficiently strong that the primary laminate remains adhered to the neck of the container when the lid is removed and a complete seal is maintained. It should, however, be weaker than the strength of the bond at the point of contact between the top layer of the seal laminate and the tabstock.

Where a secondary seal stock is adhered to the primary laminate, a polymeric adhesive with a melt flow index in the quoted range is required in order to ensure that a true weld is formed between the adhesive and the lower face of the secondary seal stock while the bond formed between the adhesive and the top plastic film layer of the primary laminate is not a true weld. In order to achieve this, the two surfaces in contact with the adhesive must be different. The adhesive must bond more strongly to the lower face of the secondary seal stock than the top plastic film layer of the primary seal laminate. The top plastic film layer of the primary laminate is therefore required to have a higher surface energy than the lower face of the second seal stock. The term "true weld" refers to the fact that a bond is formed between the adhesive and the lower face of the secondary seal stock such that if an attempt is made to separate the adhesive and lower face of the secondary seal, the adhesive material and lower face material tend to fail in preference to the bond. Preferably the bond formed between the polymeric adhesive and the top plastic layer of the primary seal stock has a peel strength in the range 50-130 g as measured on a 25 mm wide strip at 1500 mm/min. This means that in use, upon application of a torque to the cap of a container to which the seal stock laminate is attached the bond between the top plastic film stock layer of the primary laminate and the polymeric adhesive will break such that the primary laminate remains adhered to the container while the secondary seal stock would remain in the cap.

Where the seal stock laminate is attached to a container fitted with a screw cap, on turning the screw cap, the end user will break the bond and hear a "cracking noise". Where such a noise is heard it provides evidence that the container has not been tampered with. Suitable polymeric adhesives include low density polyethylene or coextruded polyethylene and polypropylene. Preferably the polymeric adhesive is polyethylene. The seal stock laminate is intended for use on closures with neck sizes of up to at least 100 mm in diameter.

The polymeric adhesive is extruded through a die head. The length of the die head is preferably in the range from 500 to 2000 mm. The gap of the die head is preferably in the range 450 to 800 µm more preferably, the gap is in the range from 500 to 700 µm. The speed of the feed rollers is in the range from 50 to 120 m/min. A typical speed of the feed rollers is, for example, 100 m/min.

The seal stock laminate of the present invention is generally formed in wide strips. Therefore in order to form the tabs, it is necessary to cut the wide strips of seal stock laminate into narrower strips. These narrower strips can then be cut to form a vessel closing assembly ready to be applied to a container. The cutting of the wide strips into narrower strips needs to be done with precision in order to ensure that the cuts are made at the correct positions to produce the tabs. The vessel closing assembly supplied ready to be used in the form of tapes can then be punched from the narrower strips and fixed inside the top of a screw cap in a procedure and/or location separate to the method of making the seal stock laminate. Unlike a conventional screw cap the screw cap suitable for use in the present invention must include a retention feature. Preferably the retention feature is quadrant shaped on top and flat underneath to minimise damage on insertion of the vessel closing assembly. The retention feature may include a multi-turn screw-thread or a multi-start part turn thread. The container may be made of glass or plastic material such as polyethylene, polyester, polyvinyl chloride, polypropylene or acrylonitrite-butadiene-styrene polymer.

A screw cap equipped with a vessel closing assembly in accordance with the present invention may be screwed on to the open neck of a container thus sandwiching the vessel closing assembly between the open neck of the container and the top of the cap. The primary laminate is then adhered to the open neck of the container by induction heating.

BRIEF DESCRIPTION OF THE DRAWINGS

An embodiment of the present invention will now be described with reference to the following figures, in which.

DETAILED DESCRIPTION

Example 1

Figure 1:
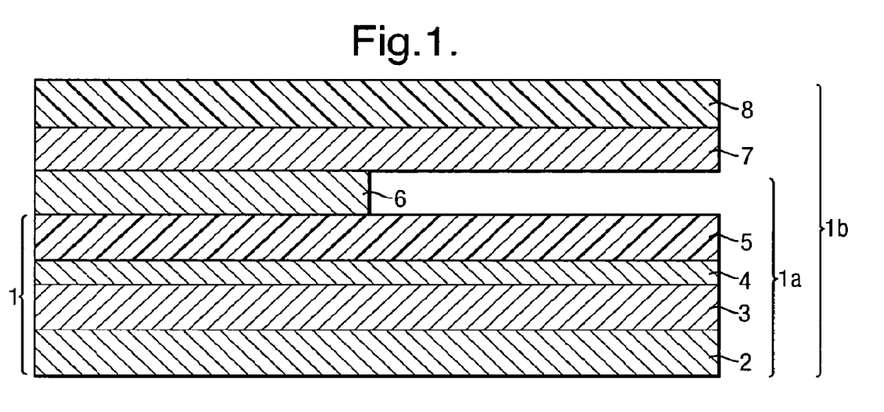
FIG. 1 is a cross section through an example of a primary laminate including a tabstock as formed according to the method of the present invention with a vertical dimension greatly exaggerated.
Figure 2:
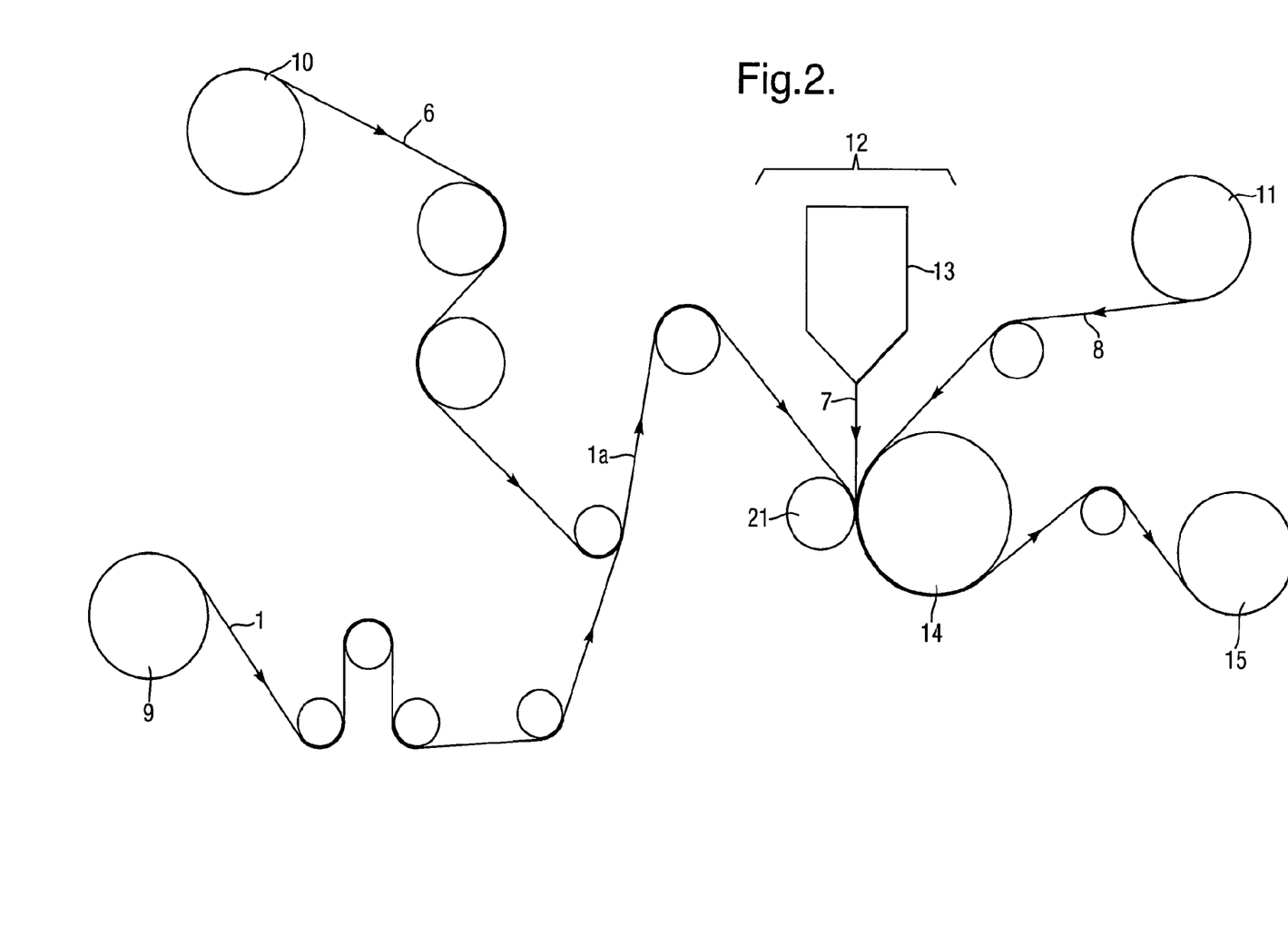
FIG. 2 is a schematic diagram of the laminating apparatus used in the method of the present invention.

A seal laminate (1) was obtained commercially from Gerosa, Spain. The seal laminate comprised heat sealable layers (2,3) for adhesion to a container to be sealed and a foil layer (4). The top layer of the seal laminate (5) is PET which has been printed on the reverse side. As an alternative to purchasing this part of the structure (2, 3, 4) as in this example, it may be laminated to the foil layer in a separate step to form the heat sealable laminate. This seal laminate is rolled onto a first feed roll (9) in the laminating apparatus.

The second feed roll (10) in the laminating apparatus is the source of the tabstock (6). The tabstock used is formed of PET which has a thickness in the range from 12-25 µm. The width of the (6) is in the range from 20-60 mm.

A third feed roll (11) is loaded with a PET stock (8) which can be obtained commercially from Toray, Europe. The thickness of the PET stock (8) is in the range from 12-36 µm. The PET stock (8) used is a co-extruded PET heat seal layer in order to ensure optimal adhesion.

The seal laminate (1), tabstock (6) and PET stock (8) are simultaneously fed to the laminating station (12) where an extruder (13) is positioned vertically above the point of contact between the feeds. Prior to reaching the laminating station (12), the seal laminate (1) and tabstock (6) are brought into contact to form a primary substrate (1a).

Ethylene methyl acrylate copolymer (7) is then extruded continuously as a curtain from the extruder (13) between the top face of the primary laminate (1a) and the bottom face of the PET stock (8). The extrusion conditions were such that a temperature of 100° C. to 200° C. was attained at the nip. The rollers (14) and (21) are moving at a speed of 70 m/min relative to the speed of application of the adhesive. the bottom face of the PET. Stock (8) and the resulting primary laminate including a tabstock is passed via a chill roller (14) to be rolled on to a final product roll (15). This process is illustrated schematically in FIG. 2.

The peel strength of a primary laminate formed using a PET stock (8) thickness of 36 µm and a tabstock thickness of 12 µm wherein the coat weight of the extruded ethylene methyl acrylate copolymer (7) was 40 gm$^{-3}$.

The coat weight was determined as follows: a 0.5 m to 1 m length of paper backed polyester which has a width of 1 m was passed to the laminating station in place of the primary laminate. A curtain of EVA was then extruded continuously between the top polyester face of the paper backed polyester and the bottom face of the PET stock (8). 10×10 cm samples were then cut across the width of the web and their weight in g was recorded. The weight of the paper backed polyester and PET stock (8) were subtracted from this figure and the result was multiplied by 100 to give a coat weight in gm$^{-2}$.

As detailed previously, the top face of the primary substrate and the bottom surface of the plastic film stock must be adhered together with a bond strength greater than 15 N/cm. In a separate experiment the bond strength was determined by using the method detailed as follows. The apparatus used was a Tensile Tester attached to a desktop PC, two jaws, a 80×12.5 mm measuring template and a sharp knife. A sample with dimensions of 12.5 mm long and 10 mm wide perpendicular to the machine direction was cut across a section of the primary laminate. Steps are taken to ensure that a section of the PET stock (8) and the primary laminate including a tabstock is separated. The height of the jaws is adjusted such that the tab is inserted into one and the base into the other. The sample is positioned so as to be pointing towards the machine. The tab and base are then pulled apart and the force required to do so is recorded from the apparatus.

Example 2

Figure 3:
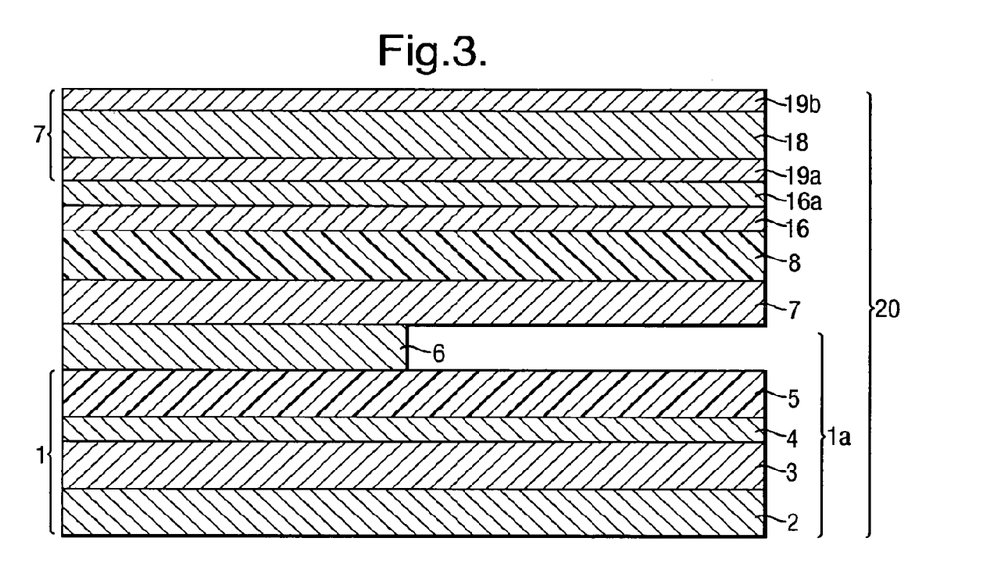
FIG. 3 is a cross section through an example of the seal stock laminate with a vertical dimension greatly exaggerated.

The primary laminate including a tabstock (1b) as formed in Example 1 was then adhered to a secondary seal stock to form a one component seal and liner system. The secondary seal stock (17) was manufactured on site at Unipac and comprises a foam layer with a thickness of 1.25 mm which is polyethylene foam (18) faced with layers on either side of polypropylene film (19). The stiffness was 320 gcm.

The same apparatus as was used to form the primary laminate including a tabstock (1b) detailed in Example 1 was used. The primary laminate including a tabstock was loaded onto feed roll (11) and the secondary seal stock (17) was loaded onto the third feed roll (9). In this case, the second feed roll (10) was redundant and thus not used. The primary laminate including a tabstock and secondary seal stock (17) were fed simultaneously to the laminating station (12). A curtain of low density polyethylene (16) with a melt flow index of 7.5 dg/min and polypropylene (16a) with an MFI of 11 dg/min was extruded continuously from the extruder between the top polyester face (8) of the primary laminate including a tabstock and the lower face of the secondary seal stock (19a) adhering the two to form a seal stock laminate (20) wherein the polypropylene (16a) adheres to the lower face of the secondary seal stock (19a) and the polyethylene (16) adheres to the top polyester face (8).

Figure 4:
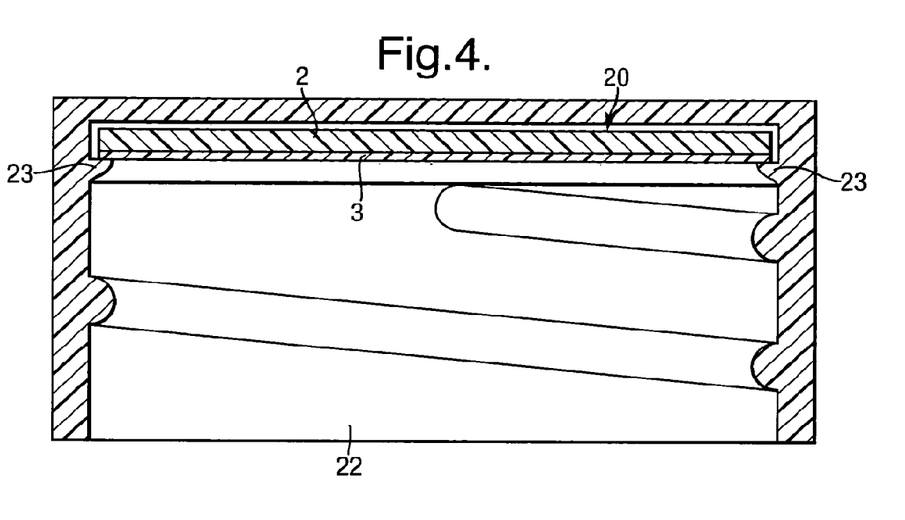
FIG. 4 is a cross-section through a screw cap showing the vessel closing assembly in place.
Figure 5:
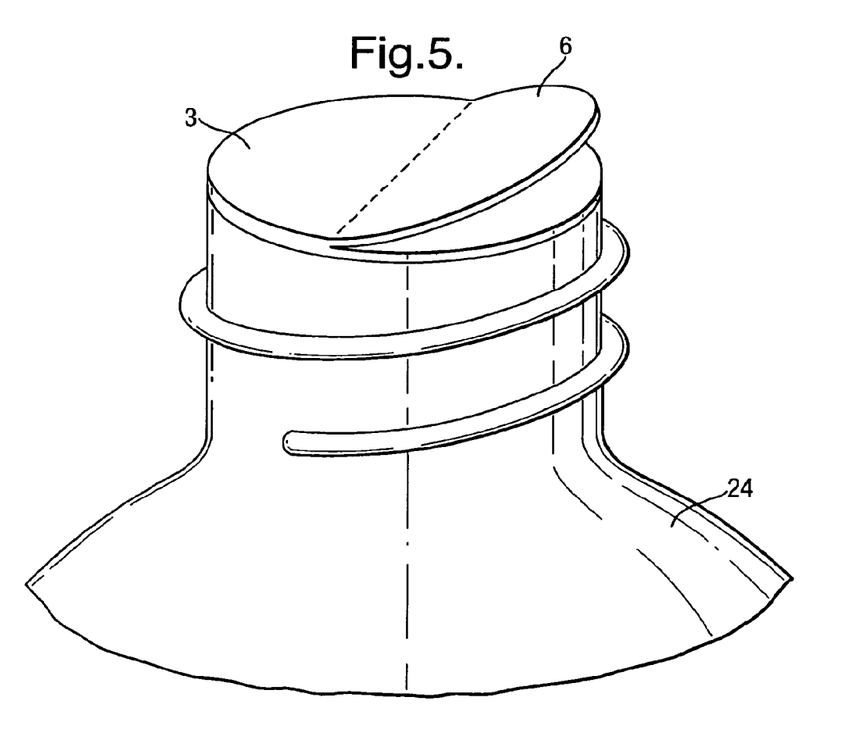
FIG. 5 is a perspective view showing the seal in place on the neck of a container.

The seal stock laminate was then cut into narrow strips. From these strips, circular discs were punched to form discs of the seal stock laminate. The seal stock laminate (20) is fixed inside the top of a screw cap (22) by means of a retention feature (23). A screw cap equipped with the seal stock laminate in accordance with the present invention is then screwed onto the open neck of the cap. The cap (22) and bottle (24) are then subjected to an induction heating step in which the foil is heated around its periphery by the generation of eddy currents within it, which, in turn, melts the heat sealable layer (2) to bond the primary laminate including a tabstock to the open neck of the bottle.

Example 3

Figure 6:
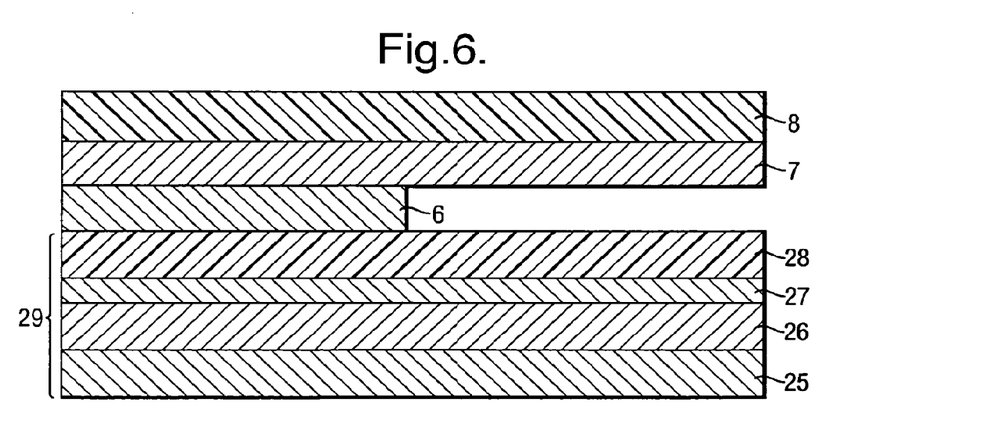
FIG. 6 is a cross section through a second embodiment of a primary laminate including a tabstock as formed according to the method of the present invention with a vertical dimension greatly exaggerated.

A seal laminate (29) comprising bottom food contact layers (25, 26) for adhesion to a container to be sealed and a foil layer (27) which has been printed are purchased from Gerosa, Spain. The lowermost layer (25) of the seal laminate consists of glassine paper with a coat weight of at least 30 gm$^{-2}$. Layer (26) is a layer of water-based adhesive with a coat weight of at least 3 gm$^{-2}$ (dry weight). The layer of aluminium foil (27) has a thickness of 8 μm. The top layer of the seal laminate (28) is PET. This is purchased as a part of the structure (25, 26, 27) or laminated to the foil layer in a separate step to form the seal laminate.

The primary laminate was formed using this seal laminate (29) in place of the seal laminate (1) having heat induction sealable layers of example 1 to produce a primary laminate. The resulting primary laminate is illustrated in FIG. 6.

The invention claimed is:

1. A primary laminate configured to form a tabbed container sealing member having a tab defined wholly within a perimeter thereof, the primary laminate comprising:
   a seal laminate including at least a bottom layer for securing to a rim surrounding a container opening, a foil layer, and a top polyester film layer;
   a tab stock film layer with a top and bottom face wherein the bottom face of the tab stock film layer is above the top polyester film layer of the seal laminate to form a primary substrate;
   an upper surface of the primary substrate having a first and a second portion wherein the first portion is formed by the top polyester film layer and the second portion is formed by the top face of the tab stock film layer;
   a layer of plastic film adhered to both the top face of the tab stock film layer and the top polyester film layer by an extruded polymeric adhesive, the layer of plastic film selected from polyethylene terephthalate, polyamide, polypropylene or a composite thereof, and the extruded polymeric adhesive selected from polyethylene, polyethylene vinyl acetate, maleic anhydride/acrylate ester/polyethylene copolymer, and ethylene methyl acrylate;
   a bond between the layer of plastic film and the top polyester film layer formed by the layer of extruded polymeric adhesive of at least about 15 N/cm; and
   further comprising a secondary seal stock having an overall stiffness in the range from 200-1200 gcm and wherein the layer of plastic film of the primary laminate is bonded to the secondary seal stock by a second extruded polymeric adhesive having a melt flow index of 5 to 25 dg/min, wherein the secondary seal stock is configured to remain in a screw cap and separate from the primary laminate when the screw cap is removed from a container.

2. The primary laminate of claim 1, wherein the upper surface of the primary substrate is free of printing that interferes with the bond formed between the layer of plastic film and the top polyester film layer.

3. The primary laminate of claim 1, wherein one of the foil layer or an underside of the top polyester film layer facing the foil layer is printed so that the printing is not in direct contact with the extruded polymeric adhesive, and the layer of plastic film, the top polyester film layer, and the extruded polymeric adhesive are transparent so that the printing is visible through the top of the primary laminate.

4. The primary laminate of claim 1, wherein the extruded polymeric adhesive is ethylene methyl acrylate, the layer of plastic film is polyethylene terephthalate, and the top polyester film layer is polyethylene terephthalate.

5. The primary laminate according to claim 1, wherein a bond of the second extruded polymeric adhesive to the secondary seal stock is greater than a bond of the second extruded polymeric adhesive to the layer of plastic film.

6. The primary laminate according to claim 5, wherein a surface energy of a lower surface of the secondary seal stock is lower than a surface energy of the layer of plastic film.

7. The primary laminate according to claim 1, further comprising a plurality of tab stock film layers spaced across the primary laminate.

8. A primary laminate configured to form a tabbed sealing member having a tab defined wholly within a perimeter thereof, the primary laminate comprising:
   a seal laminate including at least a bottom layer for securing to a rim surrounding a container opening, a foil layer, and a top non-foam polymer layer;
   a tab stock with a top and bottom face wherein the bottom face of the tab stock is in non-adhesive contact with the top non-foam polymer layer of the seal laminate to form a primary substrate, the tab stock being narrower in width than the seal laminate;
   an upper surface of the primary substrate having a first and a second portion wherein the first portion is formed by the top non-foam polymer layer and the second portion is formed by the top face of the tab stock;
   a layer of plastic film adhered to both the top face of the tab stock and the top non-foam polymer layer by an extruded polymeric adhesive;
   a bond between the layer of plastic film and the top non-foam polymer layer formed by the layer of extruded polymeric adhesive of at least about 15 N/cm; and
   further including a secondary seal stock having an overall stiffness in the range from 200-1200 gcm and wherein the layer of plastic film of the primary laminate is bonded to the secondary seal stock by a second extruded polymeric adhesive having a melt flow index of 5 to 25 dg/min, wherein the secondary seal stock is configured to remain in a screw cap and separate from the primary laminate when the screw cap is removed from a container.

9. The primary laminate of claim 8, wherein the layer of plastic film, the top non-foam polymer layer, and the extruded polymeric adhesive are transparent.

10. The primary laminate of claim 8, wherein the layer of plastic film is polyethylene terephthalate, polyamide, polypropylene or a composite thereof.

11. The primary laminate of claim 8, wherein the layer of plastic film is a coextruded multi-layer film.

12. The primary laminate of claim 8, wherein the extruded polymeric adhesive is selected from the group consisting of polyethylene, polyethylene vinyl acetate, maleic anhydride/acrylate ester/polyethylene copolymer, and ethylene methyl acrylate.

13. The primary laminate of claim 8, wherein the top non-foam polymer layer is polyethylene terephthalate.

14. The primary laminate according to claim 8, wherein a bond of the second extruded polymeric adhesive to the secondary seal stock is greater than a bond of the second extruded polymeric adhesive to the layer of plastic film.

15. The primary laminate according to claim 14, wherein a surface energy of a lower surface of the secondary seal stock is lower than a surface energy of the layer of plastic film.

16. The primary laminate according to claim a wherein the secondary seal stock is a laminate having a core layer with facing layers on opposite sides thereof.

17. The primary laminate according to claim 8, wherein the secondary seal stock is configured to separate from the primary laminate with an audible cracking indication upon unscrewing of a cap including a sealing member formed from the primary laminate to provide audible evidence that the container has not been tampered with.

18. The primary laminate according to claim 8, wherein the tab stock is a laminate of polymer layers with an adhesive tie layer therebetween.

\* \* \* \* \*